United States Patent
Schultz et al.

(10) Patent No.: US 11,036,769 B1
(45) Date of Patent: Jun. 15, 2021

(54) LINKED ELEMENT TRACKING IN DOCUMENTS

(71) Applicant: Workday, Inc., Pleasanton, CA (US)

(72) Inventors: Jay Schultz, Louisville, CO (US); Brian Lee Harper, Louisville, CO (US); Sayan Chakraborty, Niwot, CO (US); Andrew Kershaw, Louisville, CO (US); James Casey, Arvada, CO (US); Josh Lannin, Boulder, CO (US)

(73) Assignee: Workday, Inc., Pleasanton, CA (US)

( * ) Notice: Subject to any disclaimer, the term of this patent is extended or adjusted under 35 U.S.C. 154(b) by 154 days.

(21) Appl. No.: 16/028,727

(22) Filed: Jul. 6, 2018

(51) Int. Cl.
*G06F 17/00* (2019.01)
*G06F 16/28* (2019.01)
*G06F 16/21* (2019.01)
*G06F 16/23* (2019.01)
*G06F 16/2455* (2019.01)

(52) U.S. Cl.
CPC .......... *G06F 16/288* (2019.01); *G06F 16/219* (2019.01); *G06F 16/2358* (2019.01); *G06F 16/24565* (2019.01)

(58) Field of Classification Search
None
See application file for complete search history.

(56) References Cited

U.S. PATENT DOCUMENTS

| | | | | |
|---|---|---|---|---|
| 6,826,594 B1* | 11/2004 | Pettersen | ................ | H04L 29/06 709/203 |
| 9,608,870 B1* | 3/2017 | Hendriks | ............ | G06F 16/9558 |
| 10,210,142 B1* | 2/2019 | Jain | ......................... | G06F 16/94 |
| 10,515,140 B1* | 12/2019 | Scott | ..................... | G06F 40/134 |
| 2002/0065817 A1* | 5/2002 | Ito | ......................... | G06F 16/957 |
| 2006/0224615 A1* | 10/2006 | Korn | ...................... | G06Q 30/02 |
| 2007/0067370 A1* | 3/2007 | Honda | .................... | G06F 16/38 |
| 2010/0058160 A1* | 3/2010 | Navarro | ............ | G06Q 10/0637 715/208 |
| 2010/0180188 A1* | 7/2010 | Bostick | ................. | G06F 16/957 715/207 |
| 2011/0239162 A1* | 9/2011 | Kido | .................. | H04N 1/00474 715/838 |
| 2013/0111606 A1* | 5/2013 | Gu | ....................... | G06F 21/6218 726/28 |
| 2014/0164909 A1* | 6/2014 | Graff | ..................... | G06F 16/957 715/234 |
| 2014/0297350 A1* | 10/2014 | Kidron | ............. | G06Q 10/06311 705/7.18 |
| 2015/0142858 A1* | 5/2015 | Bryan | .................. | G06F 16/258 707/809 |
| 2015/0248204 A1* | 9/2015 | Morita | .................... | A63F 13/52 715/802 |
| 2016/0314102 A1* | 10/2016 | Bezar | ..................... | G06F 40/197 |
| 2016/0357716 A1* | 12/2016 | Douglas | .................. | G06F 16/22 |
| 2017/0013070 A1* | 1/2017 | Comstock | ............... | H04L 67/02 |
| 2017/0109814 A1* | 4/2017 | Boudville | ............... | H04L 67/02 |

* cited by examiner

*Primary Examiner* — Hasanul Mobin
(74) *Attorney, Agent, or Firm* — Van Pelt, Yi & James LLP

(57) ABSTRACT

A system for element tracking in documents includes a memory device, a database, and a processor. The memory device is configured to store a mapping in a memory between a linked element within a document and a database object. The database is configured to store the database object. The processor is configured to in response to an update of the database object: a) cause storage in the database of an update event associated with the linked element; and b) provide an update indication that the update associated with the linked element has occurred.

20 Claims, 6 Drawing Sheets

LINKED ELEMENT TRACKING IN DOCUMENTS

BACKGROUND OF THE INVENTION

A database user often desires to utilize database data as part of document creation. For example, creating a report utilizing database data or database calculations. The user typically accesses database data of interest and copies the data into the document being created. In the event the database data changes, the user is required to manually update the data for the change to be reflected in the document, causing a problem where database data used in a document is often stale. In addition, in the event a user desires to create a repeating document (e.g., a weekly report), the user is required to access the data each week and copy it into a new version of the document, creating unnecessary work and the possibility for errors to be introduced.

BRIEF DESCRIPTION OF THE DRAWINGS

Various embodiments of the invention are disclosed in the following detailed description and the accompanying drawings.

DETAILED DESCRIPTION

Figure 1:
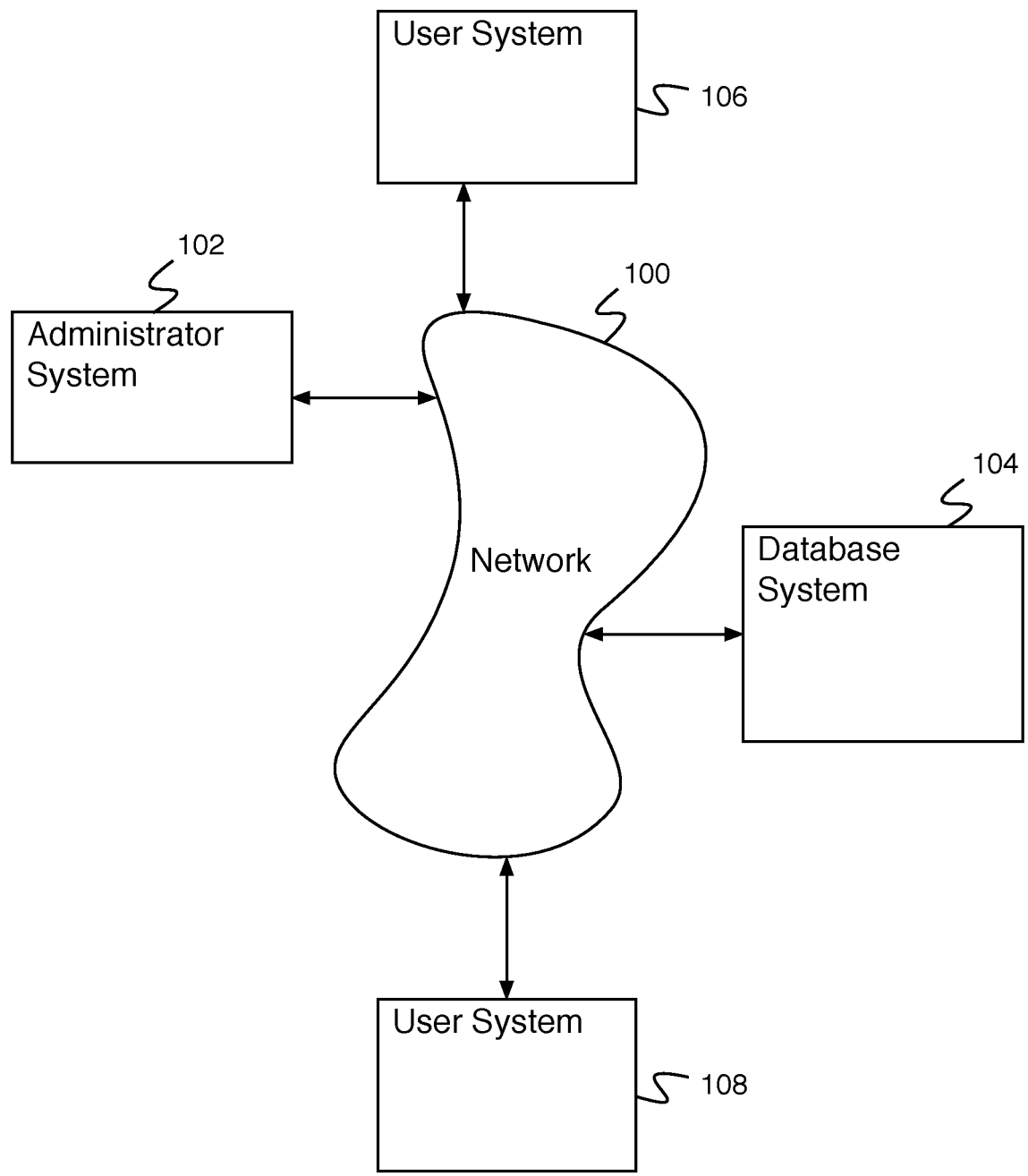
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for element tracking in documents comprises a memory device configured to store a mapping in a memory between a linked element within a document and a database object, a database configured to store the database object, and a processor configured to, in response to an update of the database object, cause storage in the database of an update event associated with the linked element, and provide an update indication that the update associated with the linked element has occurred.

A system for element tracking in documents comprises a database system for storing a database. The database stores a plurality of data, comprising human resources data, financials data, manufacturing data, etc. Database data changes as time passes, new data is received, etc. The system for element tracking in documents is in communication with a document system. For example, the document system is on the database system, the document system is on a server system in communication with the database system, the document system is on a user system in communication with the database system, etc. The document system comprises a system for creating documents, storing documents, sharing documents, etc. The system for element tracking in documents stores a mapping between a linked element within a document and a stored database object. For example, a linked element within a document is linked to a database object representing a cost projection. As database data is added to and/or modified, the cost projection can change. In response to an update of the stored database object, the system for element tracking in documents causes storage in the database of an update event associated with the linked element. The update event comprises an indication that the database object associated with the linked element has been updated. The system for element tracking in documents additionally provides an update indication that the update associated with the linked element has occurred. For example, the update indication is provided to the document system, to a document owner, to document contributors, etc. In the event that a user accesses the document including the linked element, an update indication is provided to the user. For example, the user sees a notification that linked data has been updated, a set of data describing updates to linked data, a timeline of updates to linked data, etc. The document can then be updated in response to the update indication. For example, the document can be updated automatically (e.g., once a week, every time an update indication is received, every time an update indication associated with an critical linked element is received, etc.) or manually (e.g., in response to a user making an indication to an update document button). When the document is updated the database data is copied into the document and a new document version is created.

The system for element tracking in documents improves the computer system by creating a permanent link between database data and data in a document and allowing the document to be updated as desired by the document owner. The permanent link can be used to automatically create time-sensitive reports—for example, using a single document with linked data to create a weekly financial review document including up-to-date financial data. The permanent link can additionally be used to create a change-aware fixed document—for example, a fixed document that is not intended to be regularly updated but draws attention to the creator of data changes and allows the creator to mirror the changes into the document when desired. The linking of the data element in a database and an element of the document provides an improved user interface enabling a user to efficiently visualize changes to the data element in the database as well as control changes to the document regarding the changes to the data element in the database. The linking of the data element in a database and an element of the document also provides an improved and efficient computing system for updating documents.

FIG. 1 is a block diagram illustrating an embodiment of a network system. In some embodiments, the network system of FIG. 1 comprises a network system for a system for element tracking in documents. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, database system 104, user system 106, and user system 108 communicate via network 100. Administrator system 102 comprises an administrator system for use by an administrator. Administrator system 102 comprises an administrator system for executing administrator commands, for configuring database system 104, etc. Database system 104 comprises a database system for providing user access to data stored in database system 104 (e.g., access to add data, view data, modify data, delete data, access reports, execute business processes, etc.). User system 106 and user system 108 comprise user systems for use by users. User system 106 and user system 108 store and/or access data on database system 104. A user uses a user system to interact with database system 104—for example to store database data, to request database data, to create a report based on database data, to create a document, to link an element in a document to database data, to access a document, to utilize a system for element tracking in documents, etc.

A user uses user system 106 to interact with database system 104 to create a mapping between an element in a document and a stored database object. Database system 104 comprises a system for element tracking in documents, including a database configured to store the database object and a memory device configured to store the mapping between the linked element within the document and a stored database object in a memory. The system for element tracking in documents additionally comprises a processor, wherein the processor is configured to, in response to an update of the stored database object, causes storage in the database of an update event associated with the linked element, and provides an update indication that the update associated with the linked element has occurred.

Figure 2:
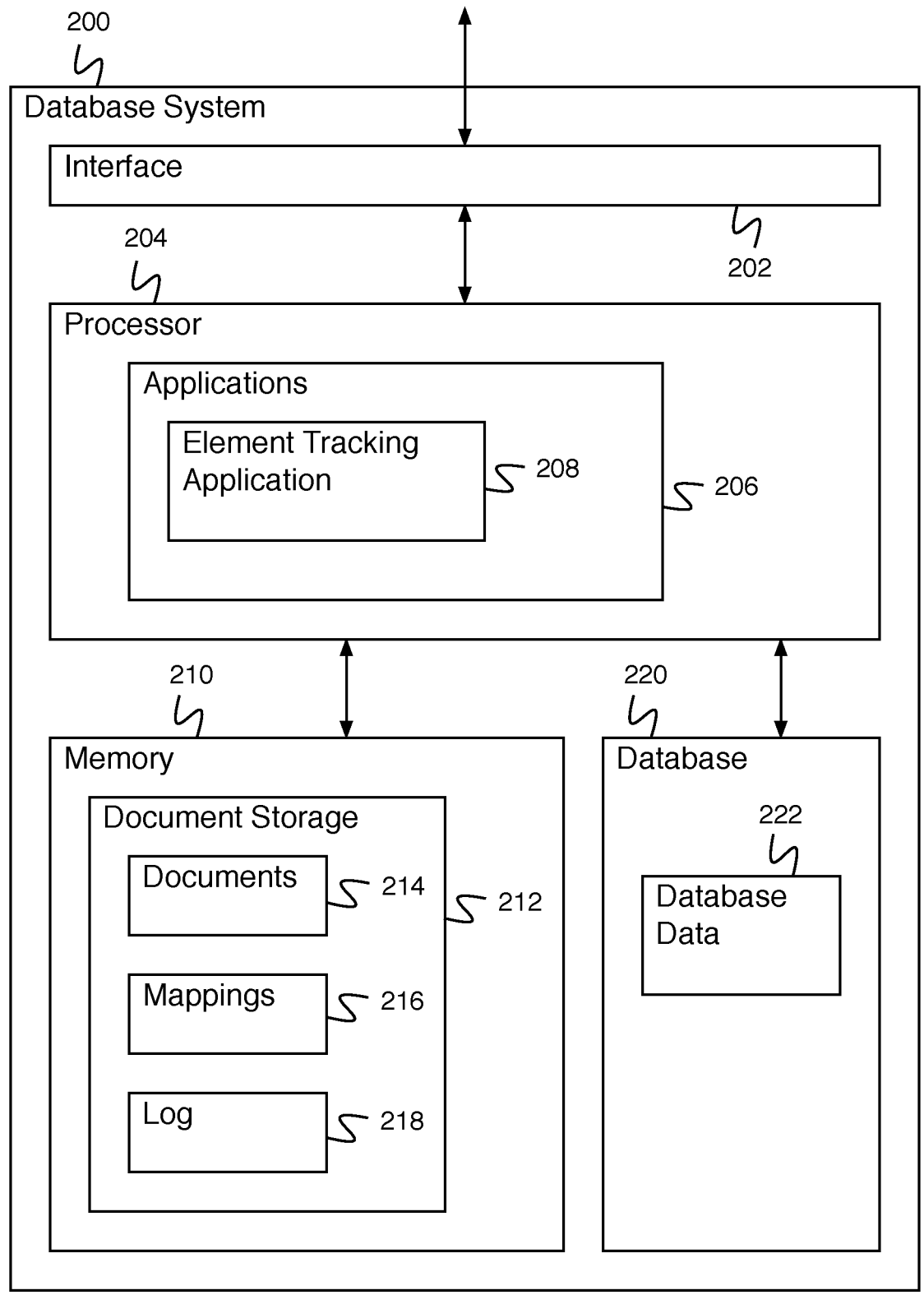
FIG. 2 is a block diagram illustrating an embodiment of a database system

FIG. 2 is a block diagram illustrating an embodiment of a database system. In some embodiments, database system 200 comprises database system 104 of FIG. 1. In the example shown, database system 200 comprises interface 202. Interface 202 comprises an interface for communicating with external systems using a network. For example, interface 202 comprises an interface for communication with a user system (e.g., for receiving a request to store data, for receiving a request to modify data, for providing a report based on data, etc.). Processor 204 comprises a processor for executing applications. Processor 204 comprises applications 206. For example, applications 206 comprises a communications application, a chat application, a web browser application, a document preparation application, a data storage and retrieval application, a user interface application, a data analysis application, etc. Applications 206 comprises element tracking application 208. Element tracking application 208 comprises an application for tracking a history of changes associated with a linked element in a document. For example, element tracking application 208 comprises an application for receiving an indication of a stored mapping in a memory between a linked element within a document and a stored database object (e.g., stored in mappings 216), receiving an indication of the stored database object stored in a database (e.g., database 220), and, in response to an update of the stored database object, causing storage in the database of an update event associated with the linked element, and providing an update indication that the update associated with the linked element has occurred.

Memory 210 comprises a memory (e.g., a hard drive, a flash drive, etc.) for storing data. Memory 210 comprises document storage 212 for storing documents (e.g., reports, spreadsheets, presentations, charts, etc.) and document related data. Document storage 212 comprises documents 214, mappings 216 (e.g., for storing mappings from document elements to data of database data 222), and log 218 (e.g., for storing update events and associated data). Database 220 comprises a database for storing database data 222. Database 220 comprises a database for storing a large amount of data, data stored in a data structure for data analysis or data retrieval, data including relations to other data, etc.

Figure 3A:
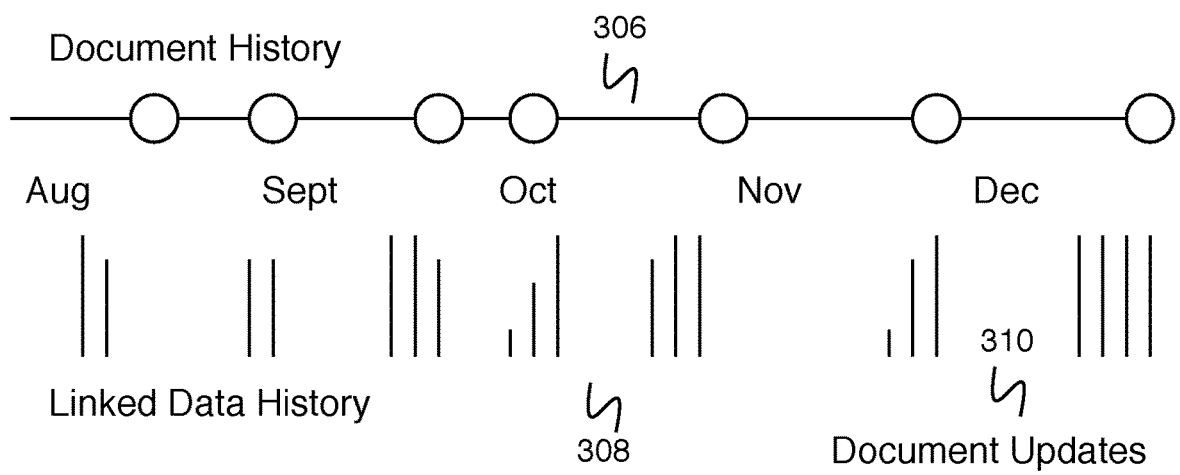
FIGS. 3A and 3B are a diagram illustrating an embodiment of a document user interface.

FIG. 3A is a diagram illustrating an embodiment of a document user interface. In the example shown, document user interface 300 comprises a user interface for interacting with a document including a linked element. For example, user interface 300 of FIG. 3A is provided by a database system (e.g., database system 200 of FIG. 2). Document user interface 300 comprises document 302 including linked element 304, document history 306, linked data history 308, and document updates 310. Document 302 comprises a document for communicating information including text and data. In the example shown, document 302 is titled "Capital Budget and Plan." Document 302 includes linked element 304. Linked element 304 comprises a value in document 302 linked to data in a database. In the example shown, linked element 304 comprises a capital budget projection. In the event that the database data linked element 304 is linked to is modified, an update event is stored and an update indication is provided. Document history 306 comprises a history of updates to document 302. In the example shown, a circle is shown in document history 306 to represent each time document 302 was updated. For example, each time document 302 was updated to reflect an updated version of linked element 304, or each time the text of document 302 was modified. Linked data history 308 comprises a graph representing a history of changes to linked data elements of document 302 (e.g., linked element 304 and any other linked elements of document 302). Linked data history 308 shows changes to linked data elements without regard to whether or when the changes were incorporated into a document update. Document updates 310 comprises a list of updates to the document, including update dates, update owners, etc. When database data associated with linked element 304 is updated, an update indication associated with the linked element is received. In response to the update indication, linked data history 308 is updated, indicating that the change has occurred.

In some embodiments, in response to the update indication, an update document interface element is provided for enabling a user to update the document. In response to a user providing an indication to the update document interface element, linked element 304 is updated to reflect the change in the database data, and a new document version is created. The new document version is shown in document history 306. In some embodiments, a revert document interface element is provided for enabling a user to revert the document (e.g., to a previous document version indicated by a circle on document history 306). For example, providing an indication to a circle of document history 306 comprises an indication to revert the document to the version indicated by the circle. The document is reverted to the indicated previous version in response to the revert document indication.

In some embodiments, a filter interface element is provided for enabling a user to request a filtered document version. A filtered document version comprises a version of document version where only elements that satisfy one or more filter conditions are displayed. A filter interface element comprises a button for requesting a filtered document version, a filter selector for selecting a filter type, a filter data entry for entering filter data, etc. For example, in response to a user providing an indication to request a filtered document version, the system is configured to determine whether the linked element satisfies a filter condition, and in response to a display indication that the linked element satisfies the filter condition, cause the linked element to display. For example, the filter condition comprises being equivalent to a specified object type, a specified object value, a specified object value range, a specified user, a specified data label (e.g., a worksheet cell, a calculated report field), a specified data table (e.g., a database report or a range within a database report), a specified data chart (e.g., an analytics chart, a database worksheet chart), a specified organizational chart, a specified person, a specified physical map location (e.g., a building location, an office location).

In some embodiments, an object access user interface object is provided for accessing a linked element in a database. For example, an object access user interface object comprises a user interface link associated with a linked element (e.g., associated with linked element 304). The system is configured to provide an object access user interface object associated with the linked element, and in response to a user indication to the object access user interface object, cause the stored database object to open (e.g., to provide access to the stored database object using a database object viewer). Accessing the stored database object comprises accessing a stored mapping between the linked element and the stored database object (e.g., in order to identify the stored database object).

Figure 3B:
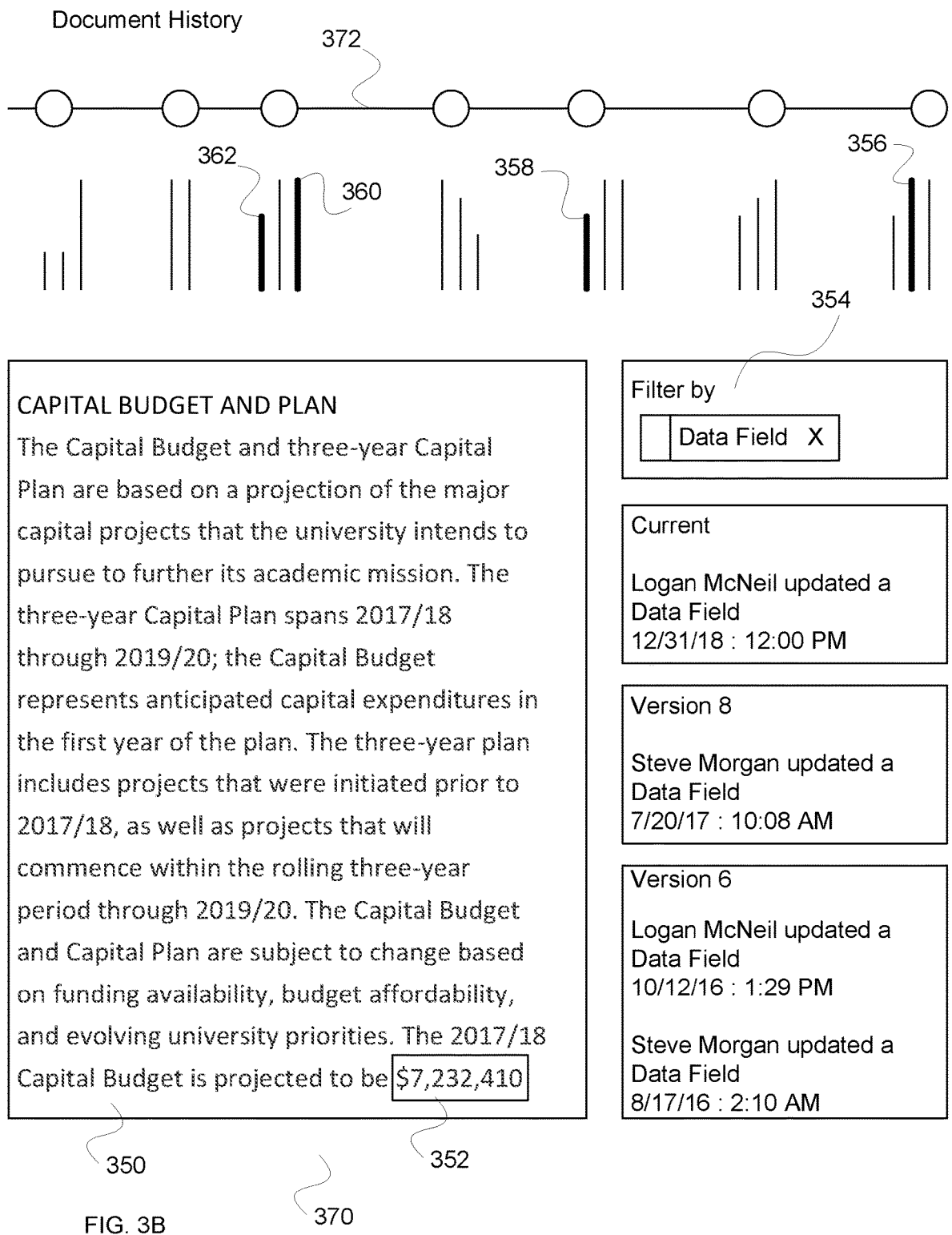

FIG. 3B is a diagram illustrating an embodiment of a document user interface. In the example shown, document user interface 370 comprises a user interface for interacting with a document including a linked element. For example, user interface 370 of FIG. 3B is provided by a database system (e.g., database system 200 of FIG. 2). Document user interface 370 comprises document 350 including linked element 352 (e.g., a data field), document history 372, linked data history, and document updates as filtered by filters 354. Document 350 comprises a document for communicating information including text and data. In the example shown, document 350 is titled "Capital Budget and Plan." Document 350 includes linked element 352 that is a data field. Linked element 352 comprises a value in document 350 linked to data in a database. In the example shown, linked element 352 comprises a capital budget projection. In the event that the database data linked element 352 is linked to is modified, an update event is stored and an update indication is provided. Document history as filtered by filters 354 (e.g., by data field) comprises a history of data field updates to document 350. In the example shown, a circle is shown in document history 372 to represent each time document 350 was updated. For example, each time document 350 was updated to reflect an updated version of linked element 352, or each time the text of document 350 was modified. Linked data history, which includes data field update 356, data field update 358, data field update 360, and data field update 362, comprises a graph representing a history of changes to filtered linked data elements of document 350 (e.g., filtered linked element 352 and any other data field elements of document 350). Linked data history on the right of the user interface 370 shows changes to filtered linked data elements without regard to whether or when the changes were incorporated into a document update.

Figure 4:
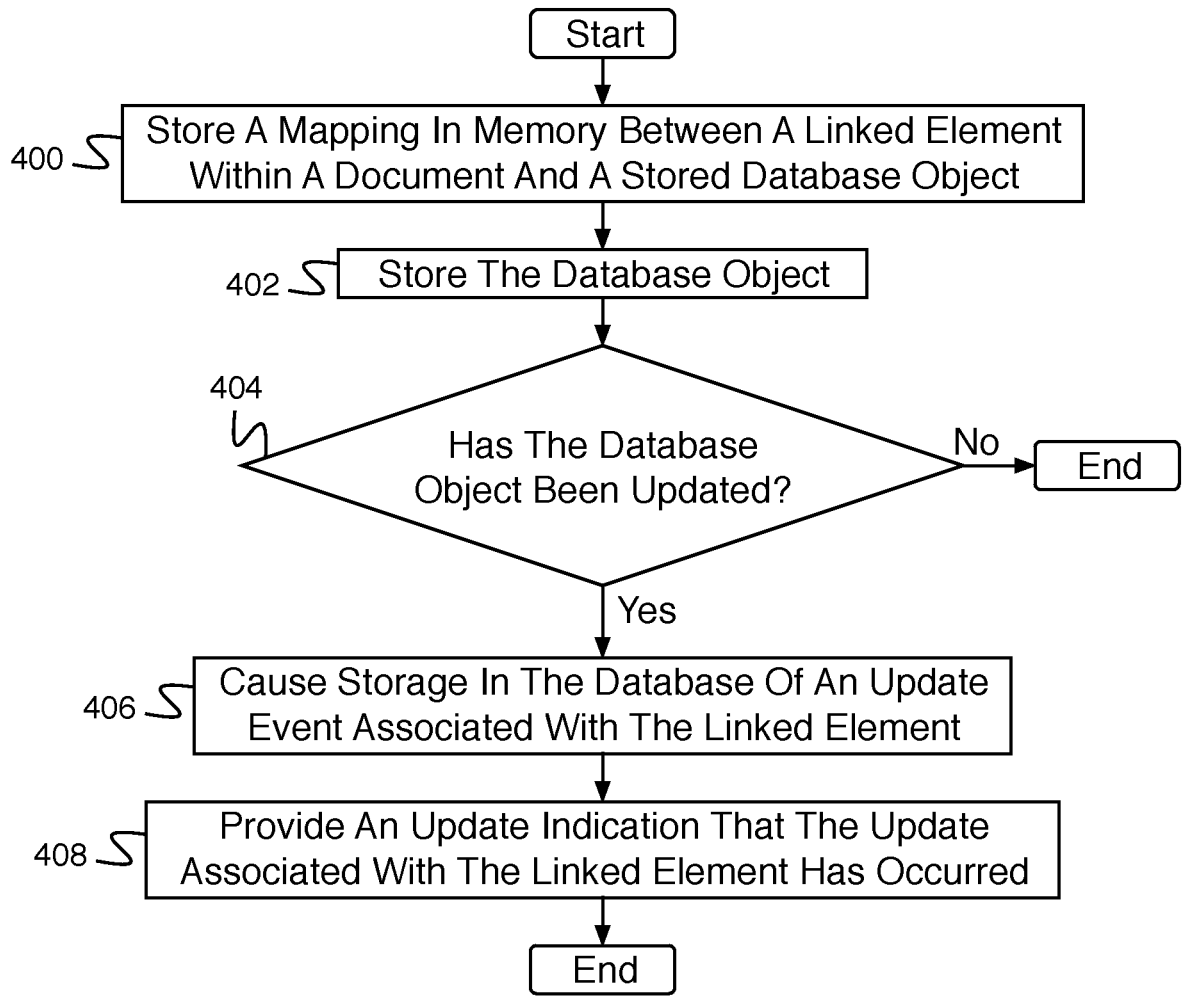
FIG. 4 is a flow diagram illustrating an embodiment of a process for element tracking in documents.

FIG. 4 is a flow diagram illustrating an embodiment of a process for element tracking in documents. In some embodiments, the process of FIG. 4 is executed by database system 200 of FIG. 2. In the example shown, in 400, a mapping is stored between a linked element within a document and a stored database object. In 402, the database object is stored. In 404, it is determined whether the database object has been updated. In the event it is determined that the database object has not been updated, the process ends. In the event it is determined that the database object has been updated, control passes to 406. In 406, the process causes storage in the database of an update event associated with the linked element. In 408, the process provides an update indication that the update associated with the linked element has occurred.

Figure 5:
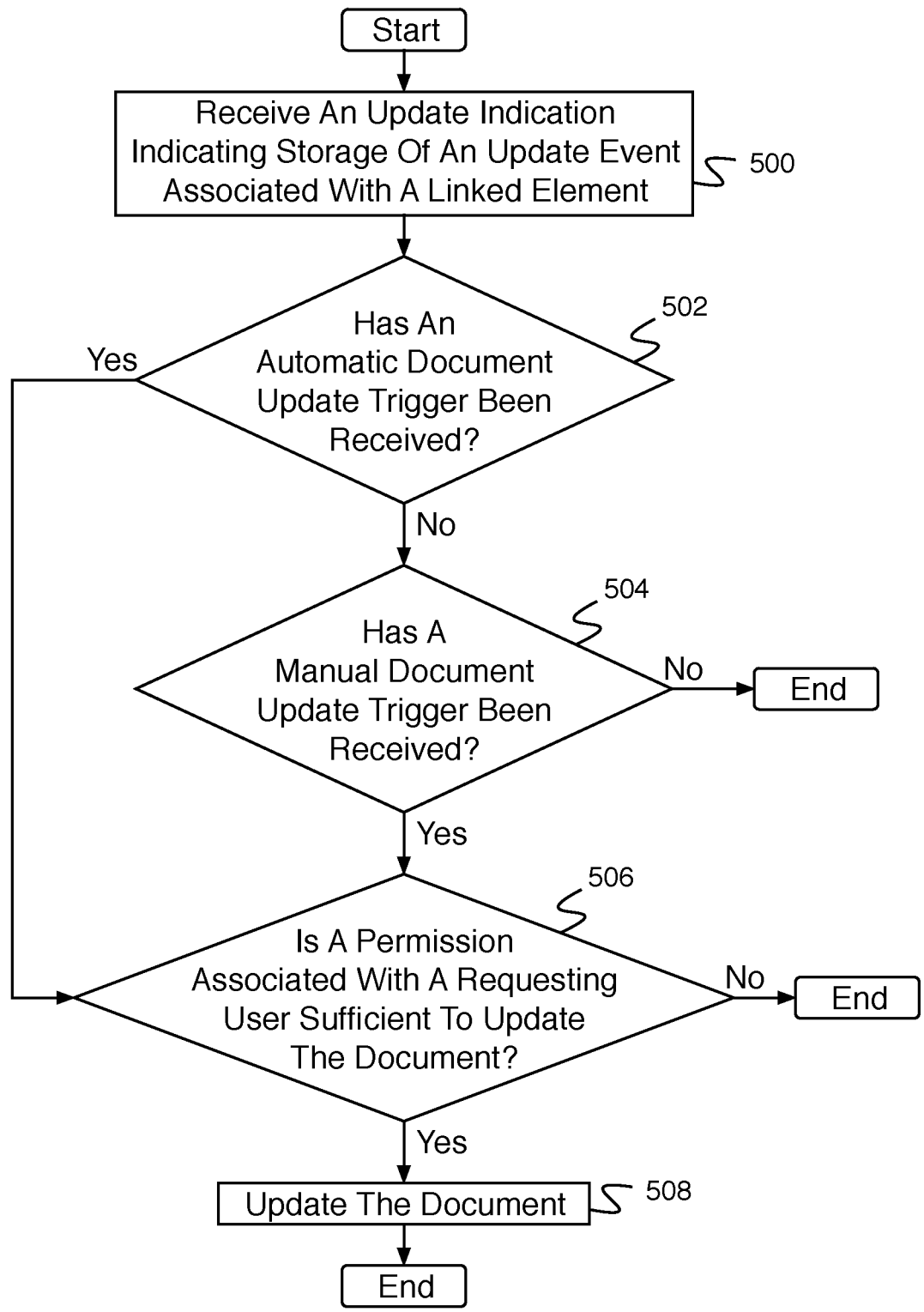
FIG. 5 is a flow diagram illustrating an embodiment of a process for updating a document.

FIG. 5 is a flow diagram illustrating an embodiment of a process for updating a document. In some embodiments, the process of FIG. 5 is executed by database system 200 of FIG. 2 in response to an update indication. In the example shown, in 500, an update indication indicating storage of an update event associated with a linked element is received. In 502, it is determined whether an automatic document trigger event has been received. For example, an automatic document trigger event comprises a condition indicating that the document should automatically be updated (e.g., at a predetermined time, an update of a data element comprising an automatic document trigger data element, all document data updated, renaming the document, publishing the document, locking the document, changing the document status (e.g., draft, in review, final status), starting a meeting using the document, etc.). In the event it is determined that an automatic document update trigger has been received, control passes to 506. In the event it is determined that an automatic document update trigger has not been received, control passes to 504. In 504, it is determined whether a manual document trigger has been received. For example, a manual document trigger comprises a user indication to an update document user interface element. In the event it is determined that a manual document trigger has not been received, the process ends. In the event it is determined that a manual document trigger has been received, control passes to 506. In 506, it is determined whether a permission associated with a requesting user is sufficient to update the document. For example, whether the user activating the manual document update trigger or the user creating the automatic document update trigger has permission to update the document. In the event it is determined that a permission associated with a requesting user is not sufficient to update the document, the process ends. In the event it is determined that a permission associated with a requesting user is sufficient to update the document, control passes to 508. In 508, the document is updated. For example, in response to a permission indication that the permission associated with the requesting user is sufficient to update the document, allowing updating of the document. In some embodiments, data associated with the update event is stored in a log (e.g., data comprising the database data being updated, the user associated with the update, the date and time of the update, etc.). The log stores data associated with a plurality of linked elements in the document and/or other documents (e.g., the log stores data associated with the linked element and data associated with another linked element). Data stored in the log is displayed using a user interface. For example, data stored in the log is displayed using the user interface of FIG. 3A and/or FIG. 3B. Data stored in the log is displayed as a document update history (e.g., comprising a timeline displaying data in the log), a linked data history, data associated with an update event, etc. Data associated with an update event comprises a revision identifier, a revision name, a revision date, a user associated with the revision, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for element tracking in documents, comprising:
   a memory device configured to store a mapping in a memory between a linked element within a document and a database object, wherein the linked element comprises a text or a value displayed in the document;
   a database configured to store the database object; and
   a processor configured to:
      cause display of the document with a linked data history and a document history;
      in response to an update of the database object:
         cause storage in the database of an update event associated with the linked element; and
         cause the linked data history to display an element update indication that the update event associated with the linked element has occurred; and
      in response to receiving a document update trigger;
         update the document, wherein updating the document comprises updating the linked element based at least in part on the update of the database object; and
         cause the document history to display a document update indication.

2. The system of claim 1, wherein the document update trigger is a manual trigger.

3. The system of claim 1, wherein the document update trigger is an automatic trigger.

4. The system of claim 3, wherein the document update trigger occurs at a predetermined time.

5. The system of claim 3, wherein the document update trigger is in response to an update triggering event.

6. The system of claim 5, wherein the update triggering event comprises one or more of the following: an updated data element comprising an automatic document trigger data element, all document data updated, renaming the document, publishing the document, locking the document, changing the document, or starting a meeting using the document.

7. The system of claim 1, wherein data associated with the update event is stored in a log.

8. The system of claim 7, wherein the log stores data associated with another linked element.

9. The system of claim 7, wherein the data stored in the log is displayed using a user interface.

10. The system of claim 9, wherein the user interface comprises a timeline displaying data in the log.

11. The system of claim 10, wherein the timeline additionally displays data associated with the update event.

12. The system of claim 7, wherein the data associated with the update event comprises a document revision identifier.

13. The system of claim 7, wherein the data associated with the update event comprises a document revision name.

14. The system of claim 1, wherein an update to the document is reverted in response to a revert document indication.

15. The system of claim 1, wherein the document comprises:
   determining whether a permission associated with a requesting user is sufficient to update the document; and
   in response to a permission indication that the permission associated with the requesting user is sufficient to update the document:
      allowing the document.

16. The system of claim 1, wherein the processor is configured to:
   determine whether the linked element satisfies a filter condition; and
   in response to a display indication that the linked element satisfies the filter condition;
      cause the linked element to display.

17. The system of claim 16, wherein the filter condition comprises being equivalent to a specified object type, a specified object value, a specified object value range, or a specified user.

18. The system of claim 1, wherein the processor is further configured to:
   provide an object access user interface object associated with the linked element; and
   in response to a user indication to the object access user interface object:
      cause the database object to open.

19. A method for element tracking in documents, comprising:
   storing a mapping in a memory between a linked element within a document and a database object, wherein the linked element comprises a text or a value displayed in the document;
   storing the database object;
   causing display of the document with a linked data history and a document history;
   in response to an update of the database object:
      causing, using a processor, storage in the database of an update event associated with the linked element; and
      causing the linked data history to display an element update indication that the update event associated with the linked element has occurred; and
   in response to receiving a document update trigger:
      the document, wherein updating the document comprises updating the linked element based at least in part on the update of the database object; and
      causing the document history to display a document update indication.

20. A computer program product for element tracking in documents, the computer program product being embodied in a non-transitory computer readable storage medium and comprising computer instructions for:

storing a mapping in a memory between a linked element within a document and a database object, wherein the linked element comprises a text or a value displayed in the document;

storing the database object;

causing display of the document with a linked data history and a document history;

in response to an update of the database object:
  causing storage in the database of an update event associated with the linked element; and
  causing the linked data history to display an element update indication that the update event associated with the linked element has occurred; and in response to receiving a document update trigger:
  updating the document, wherein updating the document comprises updating the linked element based at least in part on the update of the database object; and
  causing the document history to display a document update indication.

\* \* \* \* \*

UNITED STATES PATENT AND TRADEMARK OFFICE
CERTIFICATE OF CORRECTION

PATENT NO. : 11,036,769 B1  
APPLICATION NO. : 16/028727  
DATED : June 15, 2021  
INVENTOR(S) : Jay Schultz et al.

Page 1 of 1

It is certified that error appears in the above-identified patent and that said Letters Patent is hereby corrected as shown below:

On the Title Page

Column 2, item (56), U.S. patent documents, cite no. 1, delete "Jain" and insert --Jain et al.--, therefor.

Column 2, item (56), U.S. patent documents, cite no. 3, delete "Ito" and insert --Ito et al.--, therefor.

Column 2, item (56), U.S. patent documents, cite no. 4, delete "Korn" and insert --Korn et al.--, therefor.

Column 2, item (56), U.S. patent documents, cite no. 5, delete "Honda" and insert --Honda et al.--, therefor.

Column 2, item (56), U.S. patent documents, cite no. 6, delete "Navarro" and insert --Navarro et al.--, therefor.

Column 2, item (56), U.S. patent documents, cite no. 7, delete "Bostick" and insert --Bostick et al.--, therefor.

Column 2, item (56), U.S. patent documents, cite no. 11, delete "Kidron" and insert --Kidron et al.--, therefor.

Column 2, item (56), U.S. patent documents, cite no. 12, delete "Bryan" and insert --Bryan et al.--, therefor.

Column 2, item (56), U.S. patent documents, cite no. 15, delete "Douglas" and insert --Douglas et al.--, therefor.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*